(12) United States Patent
Schmidt et al.

(10) Patent No.: US 11,985,028 B2
(45) Date of Patent: May 14, 2024

(54) METHOD FOR CONFIGURING A NETWORK, IN PARTICULAR, IN A MOTOR VEHICLE

(71) Applicant: Audi AG, Ingolstadt (DE)

(72) Inventors: Karsten Schmidt, Ingolstadt (DE); Bernhard Stangl, Vienna (AT); Jose Antonio Munoz Cepillo, Barcelona (ES); Francisco Cotrina, Barcelona (ES)

(73) Assignee: AUDI AG, Ingolstadt (DE)

( * ) Notice: Subject to any disclaimer, the term of this patent is extended or adjusted under 35 U.S.C. 154(b) by 13 days.

(21) Appl. No.: 17/799,465

(22) PCT Filed: Feb. 10, 2021

(86) PCT No.: PCT/EP2021/053122
§ 371 (c)(1),
(2) Date: Jan. 26, 2023

(87) PCT Pub. No.: WO2021/160630
PCT Pub. Date: Aug. 19, 2021

(65) Prior Publication Data
US 2023/0145955 A1 May 11, 2023

(30) Foreign Application Priority Data
Feb. 12, 2020 (DE) ...................... 10 2020 103 546.2

(51) Int. Cl.
*H04L 43/10* (2022.01)
*H04L 41/0816* (2022.01)
(Continued)

(52) U.S. Cl.
CPC ...... *H04L 41/0816* (2013.01); *H04L 43/0817* (2013.01); *H04L 67/12* (2013.01)

(58) Field of Classification Search
CPC ...... H04L 43/0817; H04L 67/12; H94L 43/10
(Continued)

(56) References Cited

U.S. PATENT DOCUMENTS

| 7,051,101 B1 | 5/2006 | Dubrovsky et al. |
| 2004/0117513 A1 | 6/2004 | Scott |

(Continued)

FOREIGN PATENT DOCUMENTS

| EP | 2501101 A1 | 9/2012 |
| EP | 2892199 A1 | 7/2015 |

(Continued)

OTHER PUBLICATIONS

International Search Report and Written Opinion of the International Searching Authority directed to related International Patent Application No. PCT/EP2021053122, dated May 17, 2021, with attached English-language translation; 18 pages.

(Continued)

*Primary Examiner* — Jude Jean Gilles
(74) *Attorney, Agent, or Firm* — Sterne, Kessler, Goldstein & Fox P.L.L.C.

(57) ABSTRACT

The present disclosure relates to a method for configuring a network in a motor vehicle having at least a first switch and a second switch.

Figure 1:
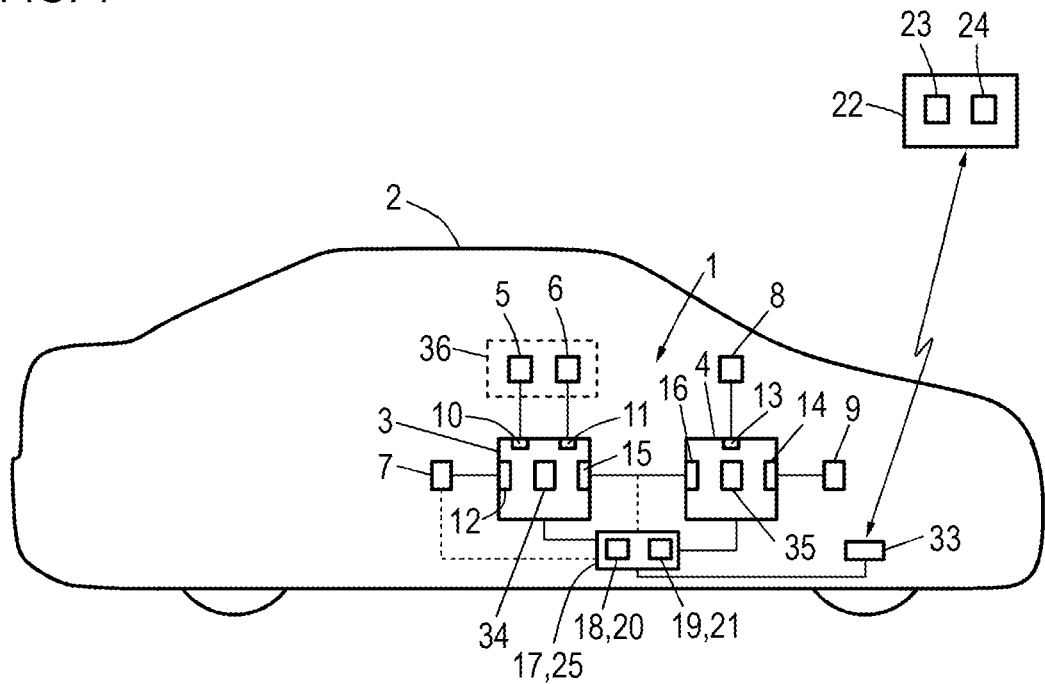

The method provides, based on a common syntax, a first piece of configuration information for the first switch and a second piece of configuration information for the second switch.

The method converts, by a respective processing module, the first piece of configuration information into a first piece of control information and the second piece of configuration information into a second piece of control information, wherein a syntax of the first piece of control information differs from a syntax of the second piece of control information.

(Continued)

The method controls the first switch according to the first piece of control information and the second switch according to the second piece of control information.

10 Claims, 1 Drawing Sheet

(51) Int. Cl.
*H04L 43/0817* (2022.01)
*H04L 67/12* (2022.01)

(58) Field of Classification Search
USPC .......................................................... 709/221
See application file for complete search history.

(56) References Cited

U.S. PATENT DOCUMENTS

| | | |
|---|---|---|
| 2015/0191151 A1 | 7/2015 | Ben Noon et al. |
| 2016/0301566 A1 | 10/2016 | Ramasubramani et al. |
| 2017/0002744 A1* | 1/2017 | Poumarede ............ H02K 7/116 |
| 2017/0034061 A1* | 2/2017 | Zhang ................... H04L 47/125 |
| 2017/0093866 A1 | 3/2017 | Ben-Noon et al. |
| 2017/0099189 A1* | 4/2017 | Kakande ............ H04Q 11/0005 |
| 2017/0214599 A1* | 7/2017 | Seo ...................... H04L 41/0816 |
| 2018/0159770 A1* | 6/2018 | Nakagawa ............... H04L 45/38 |
| 2018/0255375 A1* | 9/2018 | Cella ......................... H04Q 9/00 |
| 2018/0367607 A1* | 12/2018 | Gakhar ............... H04L 67/1031 |
| 2019/0087401 A1 | 3/2019 | Sanders et al. |
| 2019/0104057 A1* | 4/2019 | Goel ....................... H04L 45/24 |
| 2019/0149429 A1 | 5/2019 | Stocker |

FOREIGN PATENT DOCUMENTS

| | | |
|---|---|---|
| EP | 3079305 A1 | 10/2016 |
| EP | 3439235 A1 | 2/2019 |

OTHER PUBLICATIONS

International Preliminary Report on Patentability directed to related International Patent Application No. PCT/EP2021053122, completed May 20, 2022, with attached English-language translation; 12 pages.

* cited by examiner

METHOD FOR CONFIGURING A NETWORK, IN PARTICULAR, IN A MOTOR VEHICLE

TECHNICAL FIELD

The present disclosure relates to a method for configuring a network, in particular in a motor vehicle. The present disclosure also relates to a motor vehicle.

BRIEF SUMMARY

A large number of components intended to communicate with one another are now used in motor vehicles. This can be achieved, at least in part, via networks, for example, via Ethernet, wherein, with increasing complexity of corresponding networks, it can be advantageous to not only use hardware addresses of components for communication but to also make routing possible, for example, on the basis of the IP protocol.

Significantly different safety requirements can apply to different components of the motor vehicle. For example, a multimedia system should be able to play back externally provided contents without any problems, while external access to components that can directly intervene in driving operations, such as driver assistance systems, should only take place under strict requirements and from trustworthy components. In this case, it may be sufficient to statically determine which components can communicate with which other components and in what way. However, it can be advantageous to be able to adapt such a configuration dynamically, for example, if a malfunction of a component or a compromise of a component is detected.

In conventional networks, the communication access to specific components can be controlled by a so-called firewall, wherein software running in particular on a separate system sifts and filters incoming and outgoing packets. This could be implemented in a motor vehicle, for example, by using an embedded system that implements the iptables or nftables framework, for example. It is also known, for example, from document EP 2 501 101 A1, to implement a firewall as a system on a chip.

The disadvantage of using a central firewall instance, which has to monitor both a plurality of physical connections (ports) and a plurality of logical connections (sockets) simultaneously, is that this can limit the data throughput of the network and result in additional latency periods. However, additional latency periods in particular can be problematic in on-board networks, since they are supposed to also be used for communication within the framework of real-time tasks, for example, by driver assistance systems. If latencies are to be minimized and data throughput is to be maximized, the computing-intensive requirements of firewall-based solutions can result in high hardware expenditure and thus high costs and high energy consumption.

A possible alternative to using a dedicated firewall is filtering the communication via switches in the network. In this case, the so-called "wire speed," i.e., the maximum throughput of the network, can usually be maintained unchanged. Conventional switches implement a multiport bridge which forwards frames incoming at a physical connection to a further physical connection on the basis of the hardware addresses, so-called MAC addresses, contained therein. As a result, initially only very limited functions are available for filtering a communication. For example, only communications from specific MAC addresses can be allowed or denied for specific devices.

Today, some routing functions are also provided by switches. So-called layer 3 switches or switches in general, which can take information from additional layers into account, also evaluate information from higher layers of the OSI layer model for communicating frames or packets. For example, in the case of the Internet protocol, a source or destination IP address, the protocol used and/or a port can be taken into account. As a result, the communication filtering functions implemented by switches would be sufficient to implement at least a large part of the communication control functions desired in the vehicle.

In this case, however, the problem is that different manufacturers or different models or different firmware versions provide different functions and usually also have to be configured in different ways. Some switches must be configured via a manufacturer-specific hardware interface. Even switches that allow configuration via standard protocols, for example, via a command line provided via a serial interface, Telnet, Secure Shell or the like, the Simple Network Management Protocol or web browsers, differ in terms of the command syntax used or the workflows used for configuration. Therefore, configurations cannot be exchanged between different switches. If, for example, switches from different manufacturers are used in the same series or if similar network configurations are to be configured across model series that use different switches, control sequences for configuring the different switches must be developed and maintained separately. If a plurality of different switches is also used in the same network, the use of different command sets makes network configuration considerably more difficult.

BRIEF DESCRIPTION OF THE DRAWINGS/FIGURES

Figure 2:
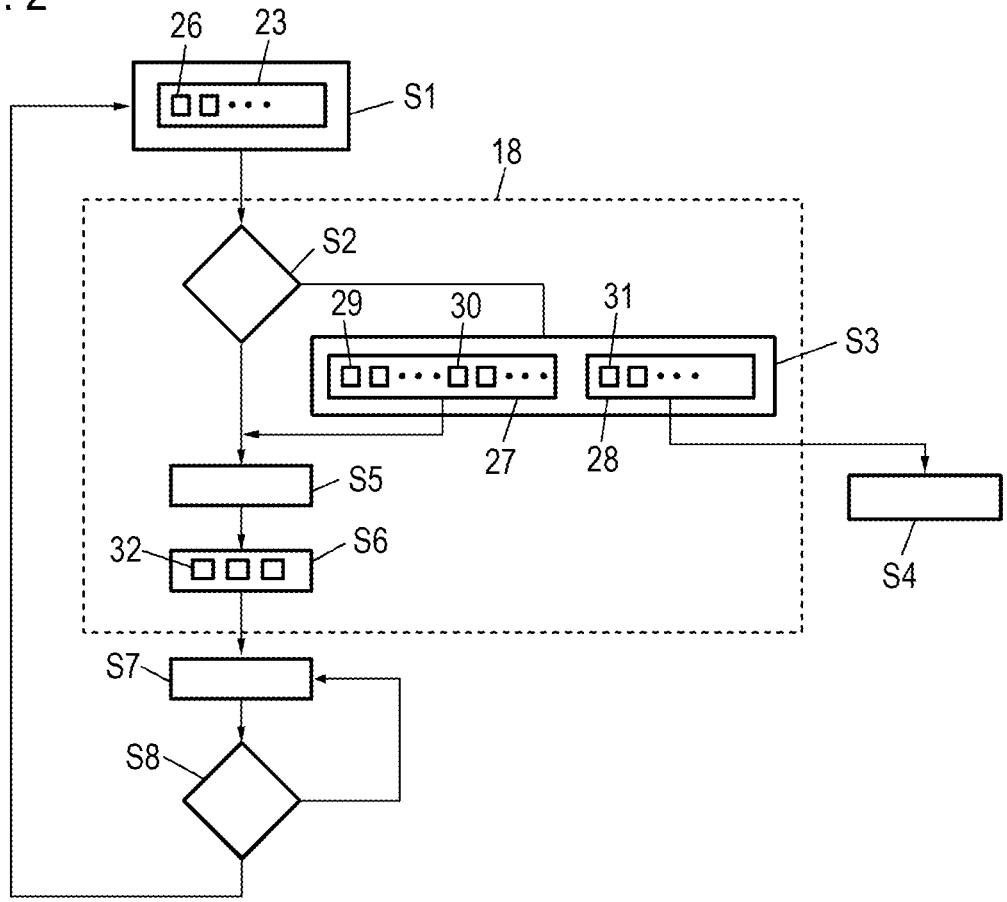

FIG. 1 shows an embodiment of a motor vehicle according to the present disclosure, which is designed to carry out an embodiment of the method according to the present disclosure; and FIG. 2 shows a flow chart of an embodiment of the method according to the present disclosure.

DETAILED DESCRIPTION

Therefore, the problem addressed by the present disclosure is that of providing an improved approach for configuring networks, in particular within motor vehicles, which in particular facilitates the configuration of routing and/or firewall rules in networks with different switches.

According to the present disclosure, the problem is solved by a method for configuring a network, in particular in a motor vehicle, comprising at least a first and a second switch, said method comprising the following steps, in any order.

The method provides a first piece of configuration information for the first switch and providing a second piece of configuration information for the second switch according to a common syntax.

The method converts the first piece of configuration information into a first piece of control information and converting the second piece of configuration information into a second piece of control information by a respective processing module, wherein a syntax of the first piece of control information differs from a syntax of the second piece of control information.

The method controls the first switch according to the first piece of control information and controlling the second switch according to the second piece of control information.

The present disclosure is based on the concept of initially defining configuration information for switches in the network in a common syntax. Since, as explained above, different switches or switches with different firmware versions require potentially different pieces of control information for setting the same configuration, processing modules that can form in particular a type of software driver for the respective switch are used in order to convert the respective piece of configuration information formulated in the common syntax into the specific piece of control information required for achieving a corresponding configuration.

This provides the advantage that, independently of the control information required for configuring the specific switch, the configuration can initially be described in a common syntax for all switches. This considerably simplifies the configuration of a plurality of switches, in particular if the common syntax is based on or corresponds to a syntax that is customary in the field of routing or firewall configurations. For example, the common syntax can be based on or correspond to a syntax used for configuration in the iptables or nftables framework. In general, a common syntax based on human language is preferably used. This is also referred to as "human readable." The common syntax preferably differs both from the syntax of the first piece of control information and from the syntax of the second piece of control information. If more than two switches are used, the syntax of each of the pieces of control information used can deviate from the common syntax, or the syntax of the pieces of control information for at least two of the switches can deviate from the common syntax.

In the method according to the present disclosure, changing a specific switch or applying the same configuration to a network comprising a different switch only requires the use of a different processing module. The configuration information itself can remain unchanged, which considerably reduces the development effort.

The method according to the present disclosure is particularly advantageous if, as will be explained in more detail below, the configuration is to be dynamically adapted, for example, if a malfunction or a compromise of a component of the network is detected. In this case, regardless of the configuration to be changed for one or more switches, a corresponding modification can be specified in the common syntax, as a result of which corresponding configuration changes can be implemented considerably more easily.

In particular, the method according to the present disclosure can also be used if the network comprises more than two switches that differ in terms of the syntax of their respective required piece of control information. For example, a respective piece of configuration information can be provided in the common syntax for more than two switches, which syntax is converted by a respective processing module into the syntax of the control information required by the respective switch, after which the respective switch can be controlled by the corresponding piece of control information.

The common syntax or the syntax of at least one of the pieces of control information can define possible commands. The respective piece of configuration information or piece of control information can thus in particular be a command list. Alternatively, the respective syntax can specify a format of configuration data to be used, for example, a data sequence, field lengths for individual configuration data, etc.

The processing module can be designed as a separate hardware module. However, the processing module is preferably a software driver. In this case, the processing modules or software drivers can be executed by a common processing device or on a respective processing device assigned to the respective switch.

In this document, the term "network" is to be interpreted broadly. In a preferred embodiment, the network is a network in which at least functions according to the third layer of the OSI layer model are implemented, i.e., in particular a routing of packets via a plurality of devices. However, it is also possible to use networks that only implement functions of lower layers, for example, an Ethernet without additional routing. Devices in which communication between two devices takes place via point-to-point connections, but different devices can communicate with one another by switching the switches, are also regarded as a network in this document. The network can therefore also be a network made up of a plurality of PCI Express devices or the like connected via the switches.

The controlling of the first and/or the second switch can specify, for at least one physical first interface, which data frames and/or data packets are transferred with which parameters from at least one physical second interface to the first interface and/or vice versa. In this case, the controlling can in particular specify rules for firewall functions, i.e., specify which data frames or data packets with which parameters are discarded or are allowed to pass. Additionally or alternatively, the controlling can also specify rules for routing.

A destination address and/or a source address used for routing and/or a hardware address of a destination device and/or source device and/or a protocol used and/or a port number and/or an identifier of a service implemented by a device of the network can be taken into account as parameters. The destination address or source address used for routing can in particular be an IP address, for example, an IPv4 or IPv6 address. A MAC address can be used as the hardware address. With regard to the protocol used, a distinction can be made, for example, between the use of a TCP protocol and a UDP protocol for the corresponding packet. Ports, which are also referred to as sockets, are address suffixes in the protocols mentioned, which suffixes can be viewed as part of the network address and, for example, identify different services on the same terminal. For example, port 80 Is typically used for http connections or web services. Identifiers for services, also called service IDs, can relate, for example, to specific network-accessible functions or other services arranged in higher layers of the OSI layer model.

On the basis of the parameters mentioned or parts of these parameters, in particular whitelists can be defined, i.e., lists of devices or groups of devices for which communication is permitted, or blacklists, i.e., lists of devices or groups of devices for which corresponding communication is blocked. Whitelists can be used, for example, to ensure that security-relevant terminals can only communicate with other defined terminals. For example, blacklists can be used to block known damaged or compromised devices.

The controlling of the first switch according to the first piece of control information and/or the controlling of the second switch according to the second piece of control information can comprise the direct setting of registers of the respective switch, in particular via a manufacturer-specific interface, and/or the sending of at least one command to the respective switch using a command line interface and/or a hypertext transfer protocol and/or the Simple Network Management Protocol and/or the Network Configuration Protocol (NETCONF). Command line interfaces can be implemented, for example, via a serial interface of the respective switch or also via the network, for example, Telnet or Secure Shell. In this case, the control information can comprise commands for opening a corresponding connection and/or a list of commands that is transmitted via a corresponding command line interface, for example, using the simulation of inputs. In particular, the http or https protocol can be used as the hypertext transmission protocol. This can be advantageous, for example, if the corresponding switch provides a web interface for configuration via a web browser. In this case, the control information can simulate user inputs in such a web browser or commands resulting therefrom, which are transmitted via the hypertext transmission protocol, in order to make an automatic configuration possible in this case as well.

In the method according to the present disclosure, processing modules can be used which are designed as software modules implementing a respective software driver for the respective switch and which are executed jointly on a processing device. As a result, the processing modules can be implemented at low hardware costs. Alternatively, it would be possible, for example, to implement each processing module by a separate processing device assigned to the respective switch and arranged in particular in the region of the respective switch. This can be advantageous, for example, if controlling is to take place via a relatively elaborate manufacturer-specific interface which, for example, allows for direct access to individual registers of the switch for configuration. In this case, the respective piece of configuration information can be supplied to the corresponding processing device, for example, via the network or another interface of relatively simple design, and only at said processing device does the conversion to the manufacturer-specific interface, which is potentially complex to implement, take place.

The processing modules used and/or the processing device used is/are preferably integrated in the motor vehicle. In this case, as explained above, a common processing device can be used, which implements the processing modules as software drivers. Alternatively, an assigned processing device can be integrated into the motor vehicle for each switch, which processing device converts the configuration information assigned to this switch into control information for this switch.

In an alternative embodiment, it would be possible to implement the processing modules outside the vehicle. For example, the configuration information could already be converted into control information for the individual switches outside the vehicle, and said control information could be transferred to the motor vehicle, for example, wirelessly. A corresponding procedure can be advantageous if the switches are to be configured exclusively by controlling them from outside the vehicle, for example, as part of the manufacture of the motor vehicle and/or maintenance processes. However, the integration of the processing modules or the processing device in the motor vehicle also allows for on-board changes to the configurations of the switches using pieces of configuration information specified according to the common syntax, which pieces of configuration information are then converted in the vehicle into corresponding pieces of control information.

The first and second switch can differ in terms of a hardware and/or firmware used in the respective switch. For example, switches from different manufacturers, different models of switches or switches programmed by different firmware can be used. In this case, it is typically already known, as part of the configuration of the motor vehicle, which switches are to be used, so that it is known which processing modules are to be used in order to provide control information for the individual switches. In other words, a suitable software driver or a suitable processing module for each of the switches is selected manually or automatically by a system that also specifies the switches used in the network, wherein each of said switches is used to convert the respective piece of configuration information into the respective piece of control information.

The first and/or second processing module can in each case check whether a respective target function described by the first and/or second piece(s) of configuration information can be implemented by the first and/or second switch itself/themselves, and otherwise at least one further device in the network can also be controlled to implement the target function jointly with the first and/or second switch. The further device can, for example, also be the processing device or one of the processing devices that executes the processing modules or a respective processing module. However, it can also be any other device.

For example, the target function may require acceptance or rejection of packets or frames on the basis of a protocol used or a port number, which is not supported by the switch to be configured. Such an unsupported function can be implemented by configuring the respective switch such that all packets or frames potentially relevant for this function are forwarded by a corresponding gateway function or routing function to the further device which can then in particular evaluate parameters not taken into account by the switch and can reject packets or frames as required or transmit them back to the switch for forwarding.

In many applications, a large part of the decisions regarding the routing or a firewall function for packets or frames are already made by the respective switch itself, and an inclusion of the further device is only necessary for a very small part of the packets or frames. In this way, target functions that cannot be fully implemented by a switch itself can also be realized at least in part by the respective switch, so that only a small amount of processing effort remains for the further device. The further device can thus be implemented at low hardware costs, for example, as part of a processing device that also implements the processing module.

The operation of at least one device connected to the network and/or communication within the network can be monitored by a monitoring module of the motor vehicle, and the first and/or second piece(s) of configuration information can be provided to change the configuration of the first and/or the second switch if a triggering condition that depends on the monitored operation and/or the monitored communication is met. The monitoring module can be implemented by a processing device that implements the processing modules or at least one of the processing modules. Alternatively, however, other devices of the network can also be used.

With regard to the monitoring of the communication, for example, numbers or contents of packets or frames with specific source or destination addresses or the like can be evaluated. When monitoring a device, it can be monitored, for example, whether this device sends a signal indicating its correct function at regular intervals. However, more complex monitoring is also possible, for example, querying specific operating parameters, cryptographic challenge-response methods or the like.

By monitoring the operation of the device or the communication in the network, it can be detected in particular if a device in the network is damaged or compromised. For example, hardware manipulations, software-based attacks or the like can be detected. If corresponding malfunctions or attacks are detected, it may be desirable, for example, to completely block communication between a compromised device and other devices in the network, to selectively block communication between this device and specific other devices or, for example, to only block one piece of communication via specific protocols or ports. This can be achieved in that the switches are reconfigured by generating corresponding configuration information.

The conversion, provided according to the present disclosure, of the respective piece of configuration information into a respective piece of control information using a respective processing module or a software driver has the advantage that the monitoring module does not need to have any knowledge of the hardware or software of the switches actually used or the syntax of their control information because the monitoring module only has to provide configuration information in the common syntax. This significantly simplifies the implementation of such a monitoring module and its use in different motor vehicle networks.

In addition to the method according to the present disclosure, the present disclosure relates to a motor vehicle having a network that comprises at least a first and a second switch, wherein said network is designed to carry out the method according to the present disclosure. In particular, the motor vehicle or a processing device of the motor vehicle implements the respective processing modules which convert the respective piece of configuration information into the respective piece of control information, as already explained above. The processing modules or the processing device implementing the processing modules or a respective processing device implementing the respective processing module is also preferably designed to control the respective switch according to the respective piece of control information. The features discussed for the method according to the present disclosure can be transferred to the motor vehicle according to the present disclosure with the advantages mentioned therein, and vice versa.

Further advantages and details of the present disclosure will become apparent from the following embodiments and the accompanying drawings.

FIG. 1 shows a motor vehicle 2 having an on-board network 1. The network 1 can make communication between a multiplicity of devices 5 to 9 in the network 1 possible. In order to reduce the number of collisions in the network 1 and to realize access control through selective routing or selective connections via gateway between devices 5 to 9, the devices 5 to 9 are not coupled directly to one another but connected to a respective physical interface 10 to 14 of the switches 3, 4. These are connected to one another via further physical interfaces 15, 16 of the switches 3, 4. By using a plurality of switches, for example, a separation between driving-relevant devices 8, 9 and more comfort-related devices 5 to 7 can be improved, wherein an exchange of information between these devices 5 to 9 is still made possible.

As shown for the devices 5, 6, a plurality of devices can be located within a VLAN 36 (Virtual Local Area Network) implemented by the respective switch 3, 4, within which communication is possible without explicit routing of packets. The switches 3, 4 are preferably so-called layer 3 switches which also allow packets to be routed between different VLANs 36 or between different devices 5 to 9.

For reasons of clarity, FIG. 1 shows a relatively small number of devices 5 to 9 and only two switches 3, 4. The teaching explained below regarding the use and configuration of the switches 3, 4 can of course also be transferred to networks 1 with a larger number of switches 3, 4 or a larger number of devices 5 to 9.

The switches 3, 4 are each configured in the motor vehicle 2 such that, in addition to routing packets between the devices 5 to 9, they also implement firewall functions. In this case, as part of the configuration of the respective switch 3, 4, rules as to which data frames or data packets are to be received, sent or forwarded via the respective interface are specified for individual interfaces 10 to 16 or also for groups of interfaces 10 to 16 or for all interfaces 10 to 16. In this case, parameters of the respective data frame or data packet are evaluated, taking into account, for example, a destination address and/or a source address used for routing and/or a hardware address of a destination device and/or source device and/or a protocol used and/or a port number. In this case, it is possible to generally discard packets for which the parameters mentioned or parts of these parameters have specific values or lie within specific value ranges. This is also referred to as blacklisting and makes it possible, for example, to prohibit communication to a specific port of a specific device 5 to 9 from a specific other device 5 to 9. Otherwise, whitelisting can take place, in which all packets that do not meet specific conditions are discarded. This can be used, for example, to allow access to a specific port of a specific device 5 to 9 only from a specific other device 5 to 9 or the like.

The explained configuration of the switches 3, 4 can be relatively elaborate in conventional motor vehicles 2 or generally in networks 1 if the hardware of the switches 3, 4 or a respective installed firmware 34, 35 differ from one another. In this case, it is possible that the configuration of the first switch 3 requires a first syntax and the configuration of the second switch 4 requires a different second syntax. In this case, it is even possible that the type of interface used for configuration is already different. For example, it would be possible for the first switch to be configured via Secure Shell access while the second switch 4 is configured via a web browser. However, even in cases where both switches 3, 4 have the same interface, the same configuration task can require different commands, different parameter sequences or the like. A configuration of the switches 3, 4 is therefore very elaborate and configurations cannot, for example, be transferred to motor vehicles 2 in which other switch types are used.

Therefore, a method for configuring the network 1 is used in the motor vehicle 2, in which method a first piece of configuration information 23 for the first switch 3 and a second piece of configuration information 24 for the second switch 4 are provided according to a common syntax and these pieces of configuration information 23, 24 are converted into the respective pieces of control information for controlling the respective switches 3, 4. A possible implementation of such a method is explained in more detail below with additional reference to FIG. 2. For reasons of clarity, FIG. 2 only shows the processing or adaptation of the first piece of configuration information 23. The second piece of configuration information 24 is processed accordingly.

In step S1, the first piece of configuration information 23 and the second piece of configuration information 24 are provided. The configuration information 23, 24 can initially describe a starting configuration of the network 1 or of the switches 3, 4, which configuration should be present, for example, upon delivery or after maintenance of the motor vehicle 2. It can be provided to a processing device 17 by a device 22 outside the vehicle, for example, via a communication device 33 of the motor vehicle 2. The processing device 17 implements processing modules 18, 19 which are used to convert the respective piece of configuration information 23, 24 into a respective piece of control information 32 used to control the respective switch 3, 4. In this case, the control information 32 shown in FIG. 2 for the first switch 3 has a different syntax than the control information (not depicted) for the switch 4.

As shown in FIG. 2, the respective piece of configuration information 23 can describe a plurality of target functions 26 which the respective switch 3, 4 is to carry out after the configuration. For example, it may be desirable that packets with a specific destination address and/or source address are generally discarded, packets with another destination address and/or source address are generally forwarded and an additional condition applies to at least one destination address and/or source address, for example, that only packets with a specific port number or a specific protocol used are forwarded. In this case, it is possible that some of these target functions cannot be implemented by the respective switch 3, 4 on its own.

Since the properties of the respective switches 3, 4 or the respective firmware 34, 35 are known in the respective processing module 18, 19 or in the implemented software drivers 20, 21, it can initially be checked in step S2 whether the target functions 26 can be implemented by the switch 3, 4 itself or whether this is only possible by means of a further device in the network. In the example shown, the processing device 17 is used as a further device, but in principle it would also be possible to use one of the devices 5 to 9 as the further device.

In the example described, it is possible, for example, that the target function evaluating a protocol used or a port number cannot be converted by the switch 3 itself because it does not evaluate the corresponding pieces of information. If this is the case, a modified piece of configuration information 27 is generated for the switch 3 in step S3, which comprises those target functions 29 that can be implemented by the switch 3 itself and also comprises target functions 30 that, jointly with target functions 31 of the further device, convert those original target functions 26 that cannot be converted by the switch 3 itself. For example, a target function 30 for the switch 3 can describe that packets with a destination address or source address, for which packets the protocol used or the port number is to be evaluated, are to be routed to the further device, and the target function 31 can specify a corresponding selection on the basis of the protocol used or the port number.

In this case, it is possible that the further device is able to directly process pieces of configuration information 28 in accordance with the common syntax. For example, the common syntax can correspond to the syntax of the iptables or nftables framework, and a corresponding framework can be implemented on the further device. Alternatively, it would also be possible to convert the pieces of configuration information 28 into pieces of control information, as will be explained below for the piece of configuration information 23, 27. In step S4, the piece of configuration information 28 is transmitted to the further device for its configuration.

The piece of configuration information 27 for the first switch 3 or, in the event that the switch 3 itself can carry out all the target functions 26, the piece of configuration information 23 is converted in step S5 by the first processing module 18 into the control information 32 for the first switch 3, which is sent to the first switch 3 in step S6.

The procedure described with reference to steps S2 to S6 for the first piece of configuration information 23, the first switch 3 and the first piece of control information 32 is accordingly repeated or executed in parallel by the second processing module 19 for the second piece of communication information 24, the second switch 4 and the second piece of control information (not depicted).

While the motor vehicle is in operation, it should be possible to change the configuration of the switches 3, 4 as required, for example, if it is detected that one of the devices 5 to 9 is damaged or has been compromised by mechanical manipulation, malware or the like. For this purpose, a monitoring module 25, which is also implemented by the processing device 17 in the example shown, as indicated by the dashed lines in FIG. 1, can monitor the communication in the network 1 and the operation of at least one of the devices 5 to 9 in step S7. With regard to the communication in the network 1, for example, the frequency or the content of specific packets can be monitored. In order to monitor individual devices 5 to 9, it can be required, for example, that they communicate with the monitoring module 25 at regular intervals. A compromise of individual devices 5 to 9 can also be detected, for example, by cryptographic challenge-response methods or the like.

In step S8, it is checked whether a triggering condition, the fulfillment of which depends on the pieces of information recorded in step S7, is met. If this is not the case, the monitoring in step S7 continues. However, if the triggering condition is met, the monitoring module 25 specifies changed configuration information 23, 24 for at least one of the switches 3, 4, said changed configuration information relating to a blacklisting of a damaged or compromised device 5 to 9, for example. In this case, the common syntax, which is independent of the specific implementation of the switches 3, 4, is used for the respective piece of configuration information 23, 24, as explained above with regard to the provision of this piece of configuration information 23, 24 outside the vehicle. As a result, special features of the switches 3, 4 or their firmware 34, 35 do not have to be known when the monitoring module 25 is implemented. Corresponding special features are instead, as already explained, taken into account by the processing modules 18, 19 or the software drivers 20, 21 implementing said processing modules.

The invention claimed is:

1. A method for configuring a network comprising at least a first switch and a second switch, the method comprising:
   providing, based on a common syntax, a first piece of configuration information for the first switch and a second piece of configuration information for the second switch;
   converting, by a respective processing module, the first piece of configuration information into a first piece of control information and the second piece of configuration information into a second piece of control information, wherein a syntax of the first piece of control information differs from a syntax of the second piece of control information; and
   controlling the first switch based on the first piece of control information and controlling the second switch based on the second piece of control information,
   wherein the respective processing module determines whether a respective target function described by at least one of the first piece of configuration information or the second piece of configuration information can be implemented by at least one of the first switch or the second switch alone, and wherein if the respective processing module determines that the respective target function cannot be implemented by at least one of the first switch or the second switch alone, the method further comprises controlling at least one further device in the network to implement the target function jointly with at least one of the first switch or the second switch.

2. The method according to claim 1, wherein the controlling the first switch and the controlling the second switch determines, for at least one physical first interface, which data frames and data packets are transferred with which parameters from at least one physical second interface to the at least one physical first interface.

3. The method according to claim 2, further comprising:
considering, as parameters, at least one of a destination address or a source address used for at least one selected from the group comprising: routing, a hardware address of a destination device, a source device, a protocol, a port number, and an identifier of a service implemented by a device of the network.

4. The method according to claim 1, wherein the controlling of the first switch based on the first piece of control information and the controlling of the second switch based on the second piece of control information further comprises:
direct setting of registers of the first switch and the second switch; and
sending at least one command to at least one of the first switch or the second switch using at least one selected from the group comprising: a command line interface, a hypertext transfer protocol, a Simple Network Management Protocol, and a Network Configuration Protocol.

5. The method according to claim 1,
wherein the respective processing modules are designed as software modules implementing a respective software driver for at least one of the first switch or the second switch, and
wherein the software modules are executed jointly on a processing device.

6. The method according to claim 5, wherein the respective processing module and the processing device are integrated in a motor vehicle.

7. The method according to claim 1, wherein a hardware of the first switch is different from a hardware of the second switch.

8. The method according to claim 1, further comprising:
monitoring an operation of the at least one further device connected to the network by a monitoring module of a motor vehicle; and
providing at least one of the first piece of configuration information or the second piece of configuration information to change a configuration of at least one of the first switch or the second switch if a triggering condition is met, wherein the triggering condition depends on the monitoring of the operation of the at least one further device connected to the network.

9. The method according to claim 1, wherein the network is located in a motor vehicle.

10. A motor vehicle, comprising:
a network comprising at least a first switch and a second switch, the network being configured to perform a method comprising:
providing, based on a common syntax, a first piece of configuration information for the first switch and a second piece of configuration information for the second switch;
converting, by a respective processing module, the first piece of configuration information into a first piece of control information and the second piece of configuration information into a second piece of control information, wherein a syntax of the first piece of control information differs from a syntax of the second piece of control information; and
controlling the first switch based on the first piece of control information and controlling the second switch based on the second piece of control information,
wherein the respective processing module determines whether a respective target function described by at least one of the first piece of configuration information or the second piece of configuration information can be implemented by at least one of the first switch or the second switch alone, and
wherein if the respective processing module determines that the respective target function cannot be implemented by at least one of the first switch or the second switch alone, the method further comprises controlling at least one further device in the network to implement the target function jointly with at least one of the first switch or the second switch.

* * * * *